(12) United States Patent
Lee et al.

(10) Patent No.: US 11,579,892 B2
(45) Date of Patent: Feb. 14, 2023

(54) DIGITAL DEVICE FOR PERFORMING BOOTING PROCESS AND CONTROL METHOD THEREFOR

(71) Applicant: LG ELECTRONICS INC., Seoul (KR)

(72) Inventors: Kyungsik Lee, Seoul (KR); Kunsu Kim, Seoul (KR); Changyun Jeong, Seoul (KR); Seungho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/415,471

(22) PCT Filed: May 29, 2019

(86) PCT No.: PCT/KR2019/006425
§ 371 (c)(1),
(2) Date: Jun. 17, 2021

(87) PCT Pub. No.: WO2020/241918
PCT Pub. Date: Dec. 3, 2020

(65) Prior Publication Data
US 2022/0066785 A1 Mar. 3, 2022

(51) Int. Cl.
*G06F 9/4401* (2018.01)
*G06F 12/1018* (2016.01)

(52) U.S. Cl.
CPC ........ *G06F 9/4401* (2013.01); *G06F 12/1018* (2013.01); *G06F 9/4418* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,332,600 B2 * | 12/2012 | Ito | G06F 11/1435 |
| | | | 711/161 |
| 2017/0116087 A1 * | 4/2017 | Nakata | G06F 11/1464 |

FOREIGN PATENT DOCUMENTS

| | | |
|---|---|---|
| JP | 2009-187134 A | 8/2009 |
| JP | 2010-72746 A | 4/2010 |

(Continued)

OTHER PUBLICATIONS

Hewlett-Packard Company et al., "Employing data de-duplication in system hibernation", Research Disclosure, Kenneth Mason Publications, vol. 544, No. 33, Aug. 1, 2009, p. 892, XP007139255.

*Primary Examiner* — Fahmida Rahman
(74) *Attorney, Agent, or Firm* — Birch, Stewart, Kolasch & Birch, LLP

(57) ABSTRACT

The present specification discloses a digital device for performing a hibernation booting process and a control method therefor. Here, the digital device according to an embodiment of the present invention comprises: a first memory; a second memory storing a snapshot image generated on the basis of pieces of page data of the first memory; and a control unit for generating the snapshot image, wherein the control unit primarily deduplicates duplicated page data in the first memory and selectively secondarily deduplicates duplicated page data by comparing the duplicated page data with the snapshot image prestored in the second memory, wherein data fragmentation is minimized through the secondary deduplication step.

16 Claims, 10 Drawing Sheets

(56) References Cited

FOREIGN PATENT DOCUMENTS

| | | |
|---|---|---|
| JP | 2014-170430 A | 9/2014 |
| JP | 2017-83933 A | 5/2017 |
| KR | 10-2015-0104605 A | 9/2015 |

* cited by examiner

FIG. 10

|  | Conventional Technology | Present Invention |
|---|---|---|
| Write Volume In Generating Snapshot Image (MiB) | 316 | 20 |
| Snapshot Image Loading Speed (MiB/sec.) | 146 | 142 |

DIGITAL DEVICE FOR PERFORMING BOOTING PROCESS AND CONTROL METHOD THEREFOR

CROSS REFERENCE TO RELATED APPLICATIONS

This application is the National Phase of PCT International Application No. PCT/KR2019/006425, filed on May 29, 2019, all of which is hereby expressly incorporated by reference into the present application.

TECHNICAL FIELD

The present disclosure relates to a method and apparatus for booting a digital device, and more particularly, to a method for generating a snapshot image for hibernation booting in, for example, a computing system.

BACKGROUND ART

In a computer file system, a snapshot image is, for example, a collection of computer files and directories, including information about the state of the system at a previous point in time.

Booting using the snapshot image, is generally referred to as hibernation booting, has an advantage of significantly improving booting speed compared to conventional system booting. Accordingly, it is used for booting embedded products or mobile terminals that require fast processing performance.

Hibernation booting provides a function to automatically preserve, in a storage such as a flash memory or a hard disk drive (HDD), the contents of the work that was executed up to the moment when the computing system is powered off.

In a typical power saving mode, a certain amount of power is consumed to maintain data. In addition, when the data is left in the power saving mode for a long time, restoration to the previous state may fail due to data loss.

However, with hibernation booting, the power may be completely turned off after creating a snapshot image of the state or data of the computing system. Accordingly, hibernation booting is advantageous in terms of power and greatly lower the risk of data loss.

On the other hand, the data size of the snapshot image for hibernation booting requires a significant data storage capacity for the storage as the data contains the contents of the work executed up to the point in time just before the system shutdown.

Moreover, for hibernation booting, the process of creating and storing a snapshot image is repeated every time the system is shut down. Accordingly, hibernation booting may continuously reduce the lifespan of the storage, which is a storage medium, depending on the use and period of use of the digital device.

Recently, various digital devices have been adopted for automobile parts. For such digital devices, lifetime reliability is very important. In order to utilize hibernation booting technology, lifetime reliability above a certain level must be guaranteed.

Therefore, there is a need for a snapshot image creation method capable of stably securing lifetime reliability while performing hibernation booting.

DISCLOSURE

Technical Problem

An object of the present disclosure is to provide a digital device for generating a snapshot image of page data stored in a RAM when a system is shut down and storing the generated page data in a flash memory, and a control method therefore.

Another object of the present disclosure is to provide a digital device capable of reducing the volume of a snapshot image to be stored by omitting duplicate page data in generating the snapshot image, and a control method therefor.

Another object of the present disclosure is to provide a digital device capable of minimizing the data fragmentation, which inevitably occurs in generating a snapshot image, through deduplication of page data, and a control method therefor.

Another object of the present disclosure is to provide a digital device capable of remarkably addressing the reliability degradation of a flash memory used as a storage space for a snapshot image, and a control method therefor.

It will be appreciated by those skilled in the art that the objects that could be achieved with the present disclosure are not limited to what has been particularly described hereinabove and the above and other objects will be more clearly understood from the following detailed description.

Technical Solution

The above and other objects of the present disclosure can be achieved by providing a method for controlling a digital device for performing a booting process, the method including: removing duplicate page data from among page data stored in a first memory; comparing page data remaining after the removing with page data pre-stored in a second memory; selectively removing the duplicate page data depending on whether the duplicate page data is located in a hot cluster of the second memory as a result of the comparison; and generating a snapshot image based on page data remaining after the selective removing.

In an embodiment, the first memory may include a random access memory (RAM), and the second memory may include a flash memory.

In an embodiment, the removing of the duplicate page data from among the page data stored in the first memory may include: calculating a hash value on a page-by-page basis for the page data stored in the first memory; and determining whether the calculated hash value is duplicate, wherein, for page data having a duplicate hash value, only location information about the duplicate page data may be stored in a mapping table.

In an embodiment, a mapping relationship between logical addresses of the page data stored in the first memory and physical addresses of page data stored in the second memory may be set in the mapping table.

In an embodiment, the selectively removing of the duplicate page data may include: performing cluster management; and determining whether the page data remaining after the primary deduplication 101 and the page data pre-stored in the second memory overlap through a hash value calculated on a page-by-page basis, wherein, when page data having a duplicate hash value is located in the hot cluster of the second memory, only location information about the duplicate page data may be stored in a mapping table.

In an embodiment, the performing of the cluster management may include: comparing the page data remaining after the primary deduplication with page data included in blocks located in the second memory; incrementing a use counter in the blocks by a predetermined value when duplicate page data is present in the blocks as a result of the comparison;

and designating a hot block and a hot cluster based on a value of the block use counter for a cluster including a predetermined number of the blocks located on the second memory.

In an embodiment, the method may further include: designating the hot block when the value of the block use counter is greater than a first threshold; and designating the hot cluster when the number of the hot blocks is greater than a second threshold and data fragmentation is less than a third threshold.

In an embodiment, the generating of the snapshot image may include: compressing page data remaining after the secondary deduplication; and allocating a cluster space for storing the compressed page data.

In an embodiment, the method may further include storing the generated snapshot image in the second memory.

In another aspect of the present disclosure, provided herein is a digital device including: a first memory; a second memory configured to store a snapshot image generated based on page data stored in the first memory; and a controller configured to generate the snapshot image, wherein the controller is configured to perform primary deduplication of removing duplicate page data from among the page data stored in the first memory, compare page data remaining after removing the duplicate page with page data pre-stored in the second memory; perform secondary deduplication of selectively removing the duplicate page data depending on whether the duplicate page data is located in a hot cluster of the second memory; and generating a snapshot image based on page data remaining after the secondary deduplication.

Advantageous Effects

The present disclosure has the following advantageous effects.

According to an embodiment among various embodiments of the present disclosure, when a system is shut down, a snapshot image corresponding to page data stored in a RAM may be generated, and a fast and stable booting may be provided using the snapshot image.

According to another embodiment among the various embodiments of the present disclosure, when generating a snapshot image for hibernation booting, the volume of a snapshot image to be stored may be reduced by omitting duplicate page data.

According to another embodiment among the various embodiments of the present disclosure, data fragmentation, which inevitably occurs when a snapshot image is generated through deduplication of page data may be minimized.

According to another embodiment among the various embodiments of the present disclosure, deterioration in lifespan reliability may be remarkably suppressed by reducing the frequency of use of a flash memory used as a storage space for a snapshot image.

The effects obtainable in the present disclosure are not limited to the above-mentioned effects, and other effects not mentioned may be clearly understood by those of ordinary skill in the art from the following description.

DESCRIPTION OF DRAWINGS

FIG. 9-(b) is a flowchart illustrating a procedure of generating a snapshot image according to the present disclosure when system power is turned off.

FIG. 10 shows data for explanation of a difference between the conventional technology and the present disclosure in volume of a snapshot image programmed or stored in a second memory when the snapshot image is generated.

BEST MODE

Hereinafter, exemplary embodiments disclosed herein will be described in detail with reference to the accompanying drawings. The same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as including all modifications, equivalents and substitutes included within the spirit and scope of the present disclosure.

It should be noted that the following examples of the present disclosure are merely intended to embody the present disclosure and are not intended to limit or define the scope of the present disclosure. What may be easily inferred by those skilled in the art to which the present disclosure pertains from the detailed description and embodiments of the present disclosure should be construed as being within the scope of the present disclosure.

The above detailed description should not be construed in all aspects as illustrative and not restrictive. The scope of the present disclosure should be determined by a reasonable interpretation of the appended claims, and all modifications within the equivalent scope of the present disclosure are included in the scope of the present disclosure.

The booting device or booting method described herein is applicable to various terminals such as, for example, a mobile phone, a smartphone, a laptop computer, a netbook, a digital broadcasting terminal, a personal digital assistant (PDA), a portable multimedia player (PMP), a navigation system, a digital TV, a desktop computer, a camcorder, a digital camera, and an MP3 player, but is not limited thereto.

Figure 1:
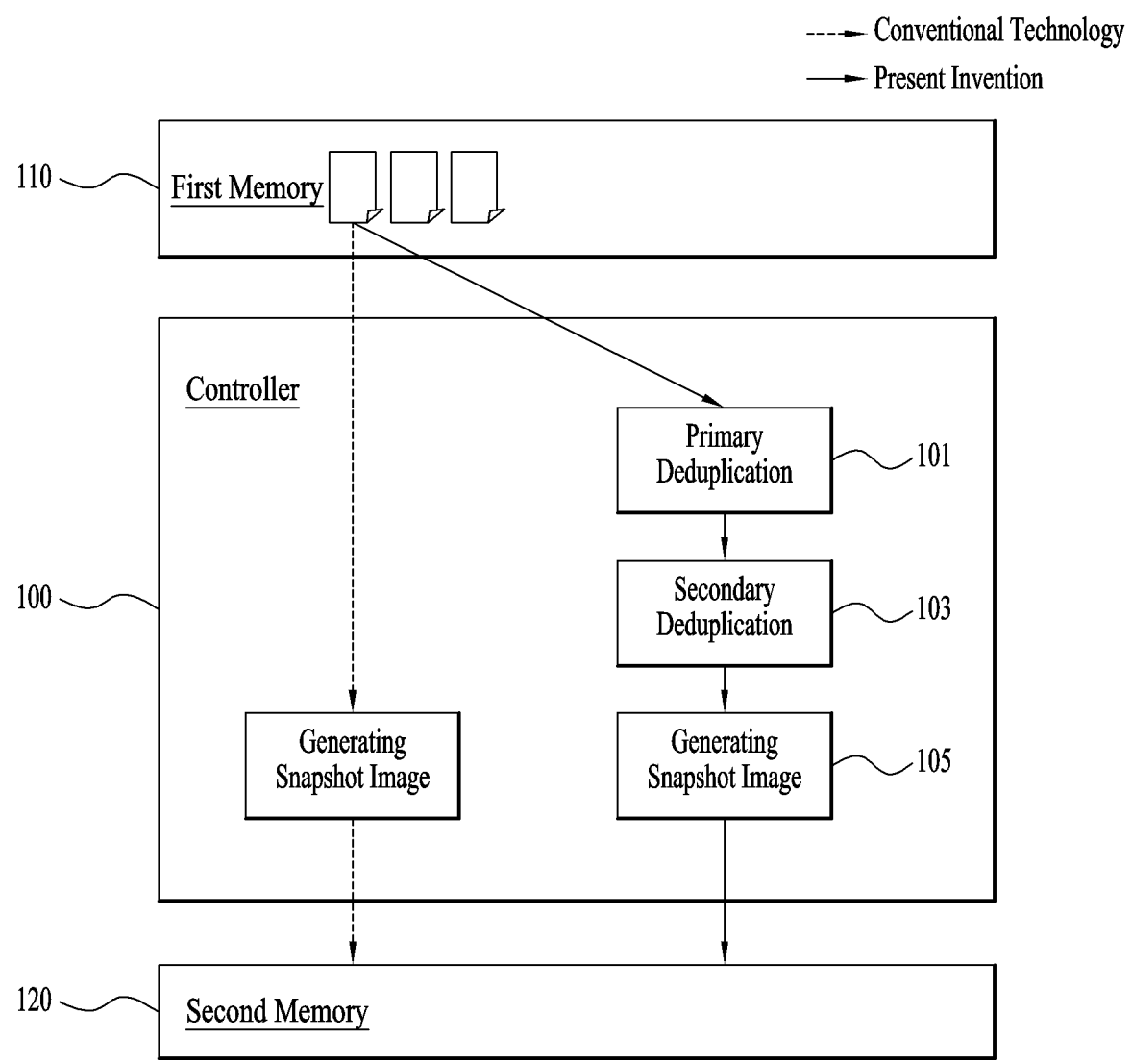
FIG. 1 is a block diagram illustrating the difference between the conventional technology and the present disclosure in generating a snapshot image for hibernation booting.

FIG. 1 is a block diagram illustrating the difference between the conventional technology and the present disclosure in generating a snapshot image for hibernation booting.

Referring to FIG. 1, a first memory 110 generally refers to a system memory such as a RAM, and data is stored in the system memory on a page-by-page basis.

When the system of the digital device is shut down, the conventional snapshot image generation technology for hibernation booting generates a snapshot image without processing the page data stored in the first memory 110, and stores the same in a second memory 120. In the present disclosure, the volume of the generated snapshot image may be reduced by removing the duplicate pages through the primary and secondary deduplication operations, rather than using the page data stored in the first memory 110 as they are.

Here, the primary deduplication operation is an operation of removing duplicate page data from among page data stored in the first memory, and the second deduplication operation is an operation of selectively removing page data that overlaps with page data in the second memory among the page data remaining after the primary deduplication operation.

Additionally, removing duplicate page data does not mean deleting page data already written on the first memory 110, but means, for example, setting to store only original page data for the duplicate page data, and to store only the location information about the corresponding original page data for the remaining duplicate page data.

In the primary deduplication operation 101, the original page data means page data located at a higher priority among the duplicate page data. In the second deduplication operation 103, the original page data means page data stored in the hot cluster area of the second memory 120 among the duplicate page data.

When a snapshot image is generated based on the page data stored in the first memory 110 through the deduplication setting, there is no need to store the duplicate page data except for the original page data, and only the information indicating the location of the original page data is stored. Accordingly, the volume of data newly programmed or stored in the second memory 120 may be remarkably reduced compared to the conventional technology.

The second memory 120 according to the present disclosure means, for example, a non-volatile memory for data storage, and includes a flash memory.

The flash memory is described below for understanding of the present disclosure. In the case of the flash memory, the number of times (lifespan) of programming (or writing) per cell is generally about 1,000 to 100,000. This depends on the programing type of the flash memory. The lifespan of a single level cell (SLC) is up to about 100,000 times, the lifespan of a multi level cell (MLC) is up to about 10,000 times, and the lifespan of a triple level cell (TLC) is up to about 1,000 times.

Accordingly, when a flash memory is used as the second memory 120, the lifespan of the flash memory decreases as the amount of page data stored in the flash memory for a snapshot image increases.

Figure 2:
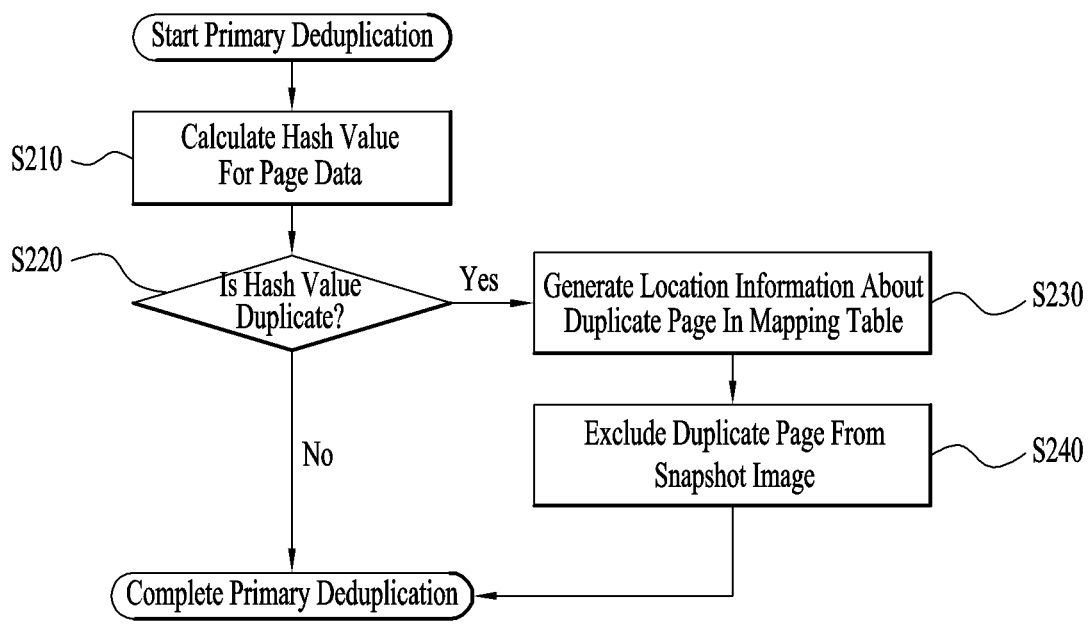
FIG. 2 is a flowchart illustrating an operation of performing primary deduplication on page data stored in a first memory according to an embodiment of the present disclosure.

FIG. 2 is a flowchart illustrating an operation 101 of performing primary deduplication on page data stored in the first memory 110 according to an embodiment of the present disclosure.

The primary deduplication operation 101 shown in FIG. 1 includes some or all of the operations shown in FIG. 2 as another embodiment.

First, an operation of calculating a hash value for the page data stored in the first memory 110 is performed (S210). The hash value means a value of a fixed length obtained using a hash function. A duplicate hash value may be regarded as duplicate page data.

The hash value may be calculated using, for example, the cryptographic hash function of at least one of Message-Digest algorithm 5 (MD5) and a secure hash algorithm (SHA). The hash function may be implemented as a software or hardware block (deduplication module).

Whether the data is duplicate page data is determined based on the calculated hash value (S220). For the remaining duplicate page data except for the original page data, only the information indicating the location of the original page data is stored in the mapping table (S230), and the corresponding page data is set not to be additionally stored in the second memory 120 (S240). Accordingly, only the location information about the duplicate page data is stored in the newly generated snapshot image, and the page data itself is not additionally stored. Thereby, the volume of the stored data may be reduced.

The mapping table (not shown) represents a mapping relationship between logical addresses of the page data stored in the first memory 110 and physical addresses of the page data stored in the second memory 120.

The logical addresses of the page data stored in the first memory 110 include location information about the deduplicated page data set after the primary and secondary deduplication based on the physical addresses of the page data stored in the first memory 110. is the address to The physical address of the page data stored in the second memory 120 represent a physical space in which each of the page data having the logical addresses is actually stored in the second memory 120.

Figure 3:
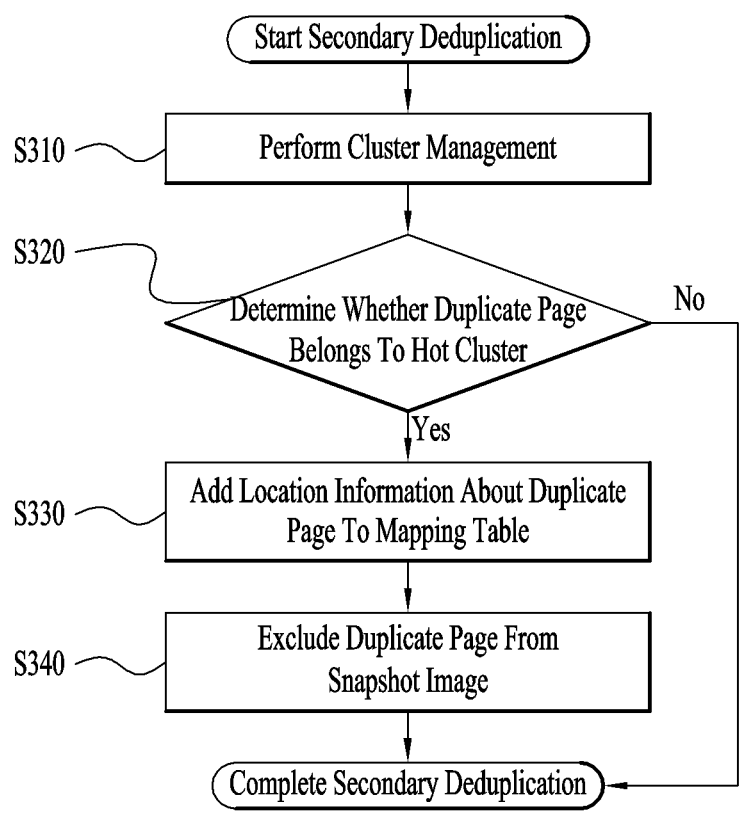
FIG. 3 is a flowchart illustrating an operation of performing secondary deduplication on page data remaining after the primary deduplication according to an embodiment of the present disclosure.

FIG. 3 is a flowchart illustrating an operation 103 of performing secondary deduplication on page data remaining after the primary deduplication operation 101 according to an embodiment of the present disclosure.

According to another embodiment, the secondary deduplication operation 103 illustrated in FIG. 1 may be implemented as illustrated in FIG. 3, and includes some or all of the operations.

The secondary deduplication operation 103 is an operation of selectively removing duplicate page data compared to the snapshot image pre-stored in the second memory 120, depending on whether the data belongs to the hot cluster of the second memory 120.

The pre-stored snapshot image refers to page data stored in the second memory 120 immediately after only the primary deduplication is performed on the page data stored in the first memory 110 when a digital device performing hibernation booting operates for the first time and the system thereof is shut down, Additionally, the snapshot image generated first includes a cluster table and a mapping table for later use in the secondary deduplication.

The cluster table is a table containing information about clusters in which snapshot images are stored. Multiple page data may be stored in one cluster, and information indicating a hash value of each of the page data is stored in the cluster table.

Here, a cluster is an area of a certain size for storing data. In the present disclosure, page data of one page is stored in one page space, and a certain number of pages are gathered to constitute one block. A certain number of blocks constitute a cluster unit. In general, a certain number of clusters are required to store a snapshot image.

The secondary deduplication operation 103 starts with execution of cluster management (S310). First, the number of redundant uses is count for each cluster through cluster management and a hot cluster is designated.

Thereafter, it is checked whether the page data remaining after the primary deduplication operation 101 overlaps with the page data in the snapshot image pre-stored in the second memory 120.

When there is duplicate page data, it is determined whether the page data is located in a hot cluster in the second memory 120 (S320).

As a result of the determination S320, when the duplicate page data belongs to the hot cluster, it is set to add only the location information about the original page data to the mapping table for the duplicate page data, excluding the original page data present in the hot cluster (S330).

As a result of the determination S320, when the duplicate page data does not belong to the hot cluster, the duplicate page data is set to be stored in a new cluster space in the second memory 120 for a snapshot image without deduplication (S340).

Dividing the cases as described above and storing the page data by allocating a separate cluster space even when three is duplicate page data is intended to minimize data fragmentation.

In general, by deduplication of the page data, the data volume to be additionally programmed in the second memory 120 is reduced when the snapshot image is generated. However, when the system is booted, the data loading time may be long because the data of the snapshot image is stored in multiple separated spaces instead of a continuous storage space.

Therefore, in order to minimize data fragmentation, page data is likely to cause data fragmentation is not deduplicated but is continuously stored in a separate allocated storage space rather than removing all duplicate page data, from the perspective of hibernation booting speed.

The hot cluster is a concept newly introduced in the present disclosure to address the issue of data fragmentation, and a detailed description thereof will be provided later.

Figure 4:
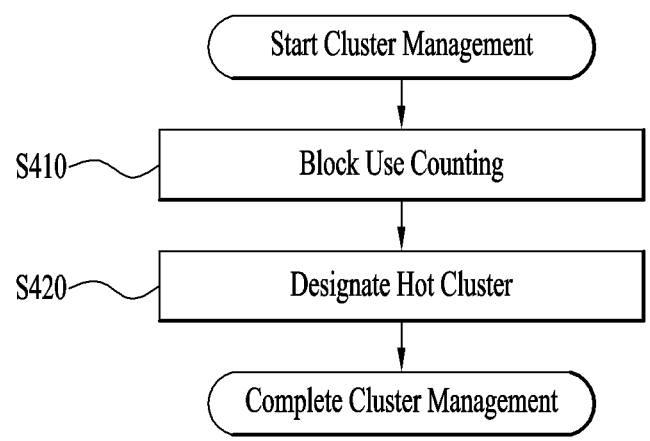
FIG. 4 is a flowchart illustrating an operation of performing cluster management according to an embodiment of the present disclosure.

FIG. 4 is a flowchart illustrating an operation S310 of performing cluster management according to an embodiment of the present disclosure.

In another embodiment, the operation S310 of performing cluster management illustrated in FIG. 3 may be implemented as in FIG. 4, and includes some or all of the operation.

Cluster management is a process of updating information on clusters in which the snapshot image stored in the second memory 120 is located, and is largely divided into counting the number of times of redundant use of a block (S410) and designating a hot cluster (S420).

Counting the number of times of redundant use of a block (S410) is an operation of updating information on blocks in which page data constituting a pre-stored snapshot image is stored. According to this operation, when the page data remaining after the primary deduplication overlaps with the page data in the block, the block use counter is incremented by a certain value from a reference value.

When a cluster table is first created, the block use counter may be set to a specific value that is 0 or a positive number as a reference value. When the block use counter is set to 0, the block use counter is incremented by a certain value from 0 depending on the presence or absence of duplicate pages. When a specific positive value other than 0 is specified from the beginning, the block use counter may be set to be incremented or decremented by a certain value depending on the presence or absence of duplicate pages.

Designating a hot cluster (S420) is an operation of determining whether the clusters in which the blocks are gathered are hot clusters based on the number of hot blocks and the degree of data fragmentation.

When the cluster management is performed (S310), the pre-stored cluster table information is also updated (S650). The information includes whether a cluster is a hot cluster, a hash value of page data, and a reference value for the number of times of duplicate use of the block.

Figure 5:
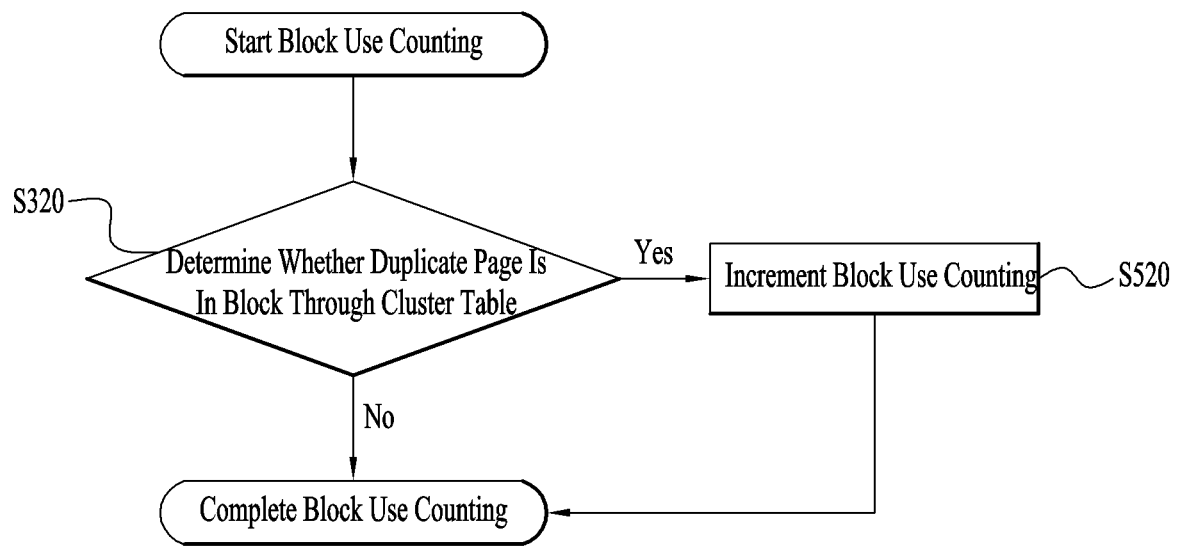
FIG. 5 is a flowchart illustrating an operation of performing block use counting according to an embodiment of the present disclosure.

FIG. 5 is a flowchart illustrating an operation S410 of performing block use counting according to an embodiment of the present disclosure.

In another embodiment, the operation S410 of performing the block use counting shown in FIG. 4 may be implemented as in FIG. 5, and includes some or all of the operations.

A block is a data storage space that is a super ordinate concept of a page and a subordinate concept of a cluster. A certain amount of page space exists in one block.

Based on the block of the second memory 120 in which the page data of the existing snapshot image is stored, it is checked whether there is page data overlapping with the page data remaining after the primary deduplication operation 101 (S510). When there is duplicate page data in the block, the block use counter is incremented by a certain value from the reference value (S520).

In checking whether there is duplicate data, presence of duplicate data is determined based on whether the hash values of the page data are duplicated as in the case of the primary deduplication. In this case, comparison of the hash values are performed based on the hash value information of the cluster table pre-stored in the second memory 120 and hash value information used in the primary deduplication (S510).

Figure 6:
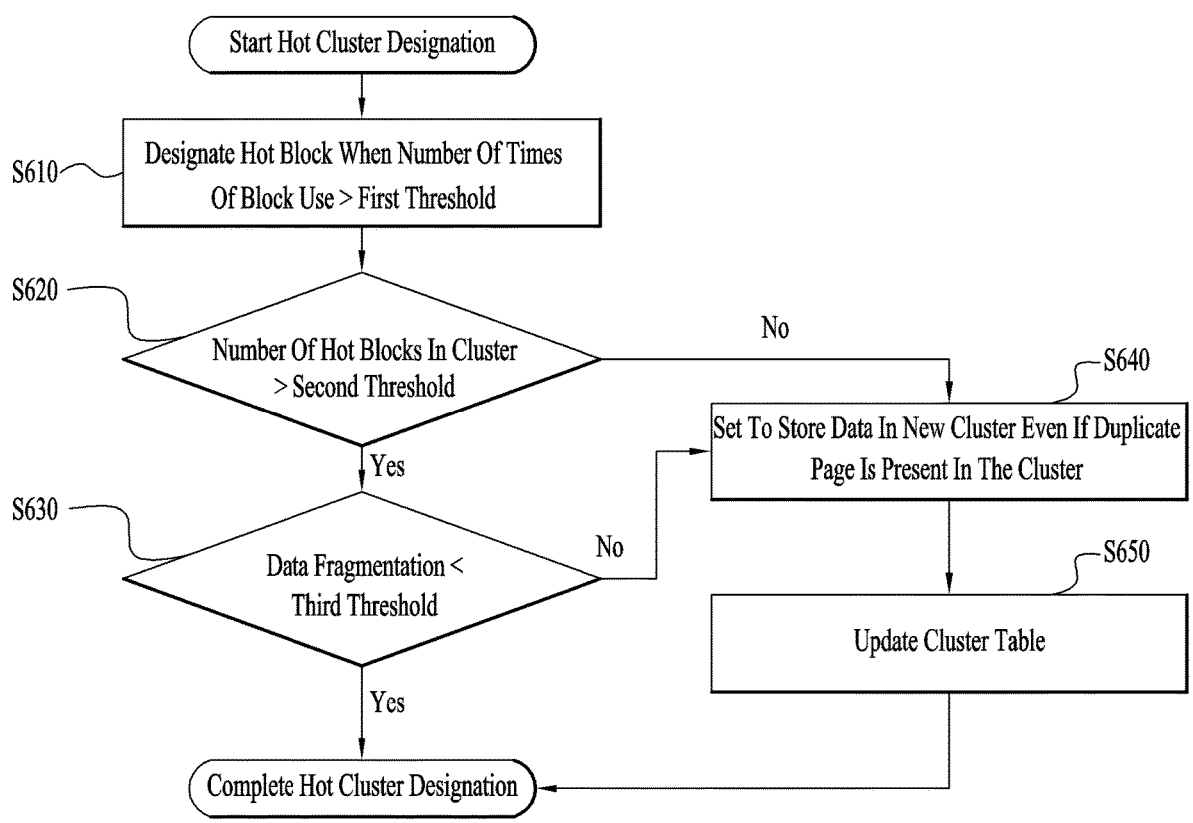
FIG. 6 is a flowchart illustrating an operation of designating a hot cluster according to an embodiment of the present disclosure.

FIG. 6 is a flowchart illustrating the operation S420 of designating a hot cluster according to an embodiment of the present disclosure.

In another embodiment, the operation S420 of designating a hot cluster shown in FIG. 4 may be implemented as in FIG. 6, and includes some or all of the operations.

Based on the number of times of duplicate use of the block obtained in the block use counting operation S410, the block is designated as a hot block when the number of times of block use that the block has is greater than a first threshold (S610).

Accordingly, a hot block represents, for example, a block having multiple duplicate page data.

Thereafter, the number of hot blocks in each cluster including a predetermined number of blocks is checked and compared with a second threshold (S620).

When the number of hot blocks present in a cluster is greater than the second threshold, the degree of data fragmentation in the cluster is checked.

When the degree of data fragmentation is greater than a third threshold, the cluster is designated as a hot cluster (S630), and is used as a reference for the secondary data deduplication.

In the case of a cluster have with hot blocks fewer than a certain number or a cluster that does not satisfy the condition for data fragmentation, any duplicate page data is not subjected to deduplication in the secondary deduplication operation, the duplicates are not deduplicated, but is set to be stored by designating a new cluster. In addition, such information is stored in the cluster table.

Here, since the hot cluster is an area where multiple duplicate page data are present and the degree of data fragmentation is small, data belonging to the hot cluster may be loaded at a high speed in a subsequent booting operation.

On the other hand, for duplicate page data not belonging to the hot cluster, data fragmentation may be prevented in future data loading by allocating a new cluster and continuously storing the data therein.

Additionally, it is possible to designate a cold cluster in addition to the hot cluster. A cold cluster refers to a cluster having a certain number of cold blocks, which are opposite to hot blocks.

A cold block refers to a block having the number of times of duplicate use less than or equal to a certain value, which means a block in which there is almost no duplicate page data.

Therefore, in the case of the duplicate page data belonging to the cold cluster, data fragmentation may be prevented in the future loading operation by allocating a new cluster and continuously storing the data therein.

The hot cluster and the cold cluster may be designated at the same time or only one of them may be designated. While it is described in the embodiment of the present disclosure that only the hot cluster is designated as an example, the present disclosure is not limited thereto.

Figure 7:
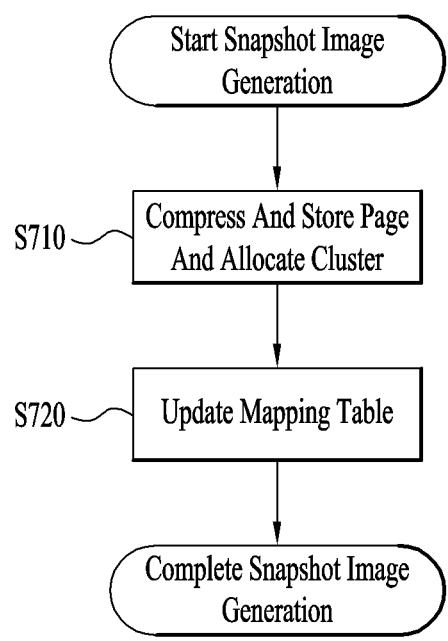
FIG. 7 is a flowchart illustrating an operation of generating a snapshot image according to an embodiment of the present disclosure.

FIG. 7 is a flowchart illustrating an operation 105 of generating a snapshot image according to an embodiment of the present disclosure.

In another embodiment, the operation 105 of generating a snapshot image shown in FIG. 1 may be implemented as in FIG. 7, and includes some or all of the operations.

First, page data remaining after completion of the secondary deduplication is compressed, and a cluster space to store the compressed page data is allocated (S710).

Since the allocated cluster is a physical address at which page data is actually stored in the second memory 120, the mapping table is updated based on the related information (S720).

Figure 8:
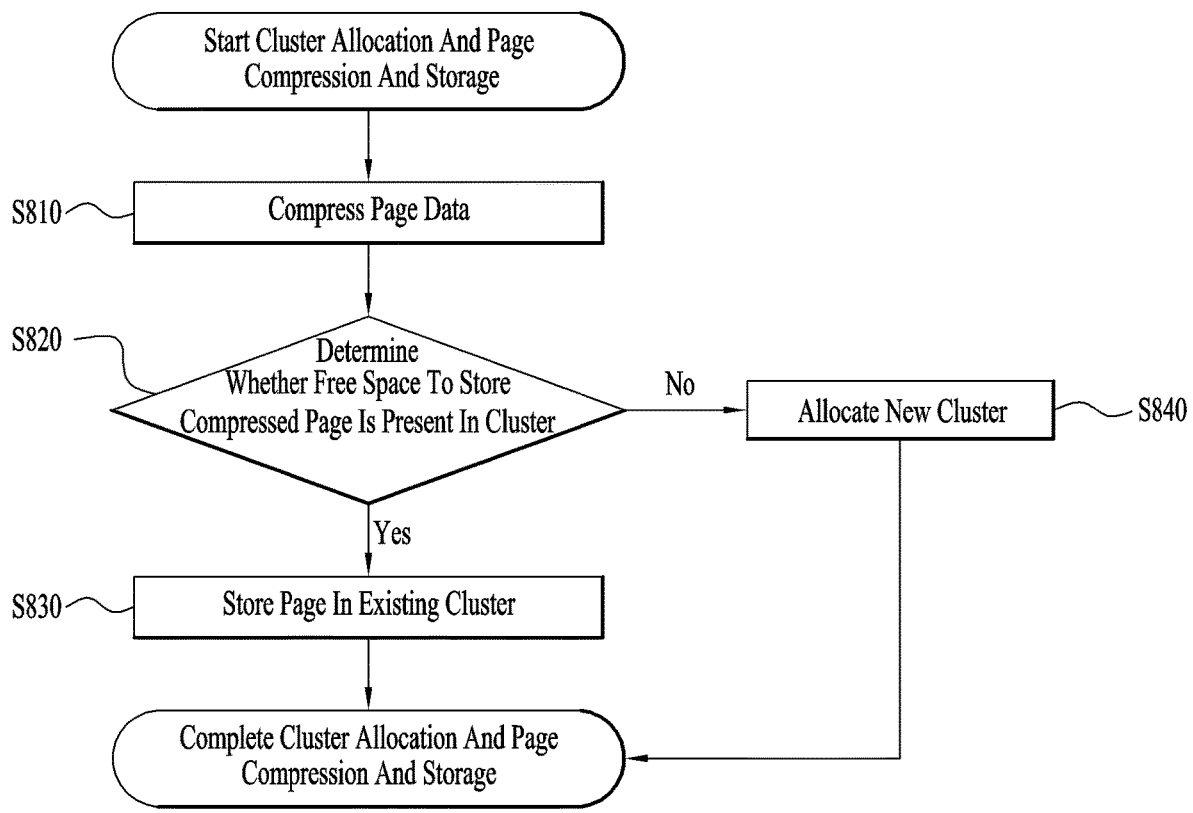
FIG. 8 is a flowchart illustrating an operation of allocating a cluster and compressing a page according to an embodiment of the present disclosure.

FIG. 8 is a flowchart illustrating an operation S710 of allocating a cluster and compressing a page according to an embodiment of the present disclosure.

In another embodiment, the operation S710 of allocating a cluster and compressing a page shown in FIG. 7 may be implemented as in FIG. 8, and includes some or all of the operations.

First, page data newly included in the snapshot image is compressed (S810), and a free space in which the compressed page is to be stored in the cluster is identified (S820).

When there is a free space in the cluster, it is set to store the compressed page data in the existing cluster (S830). When the space is not enough to store the data, it is set to allocate a new cluster and store the data therein (S840).

Figure 9:
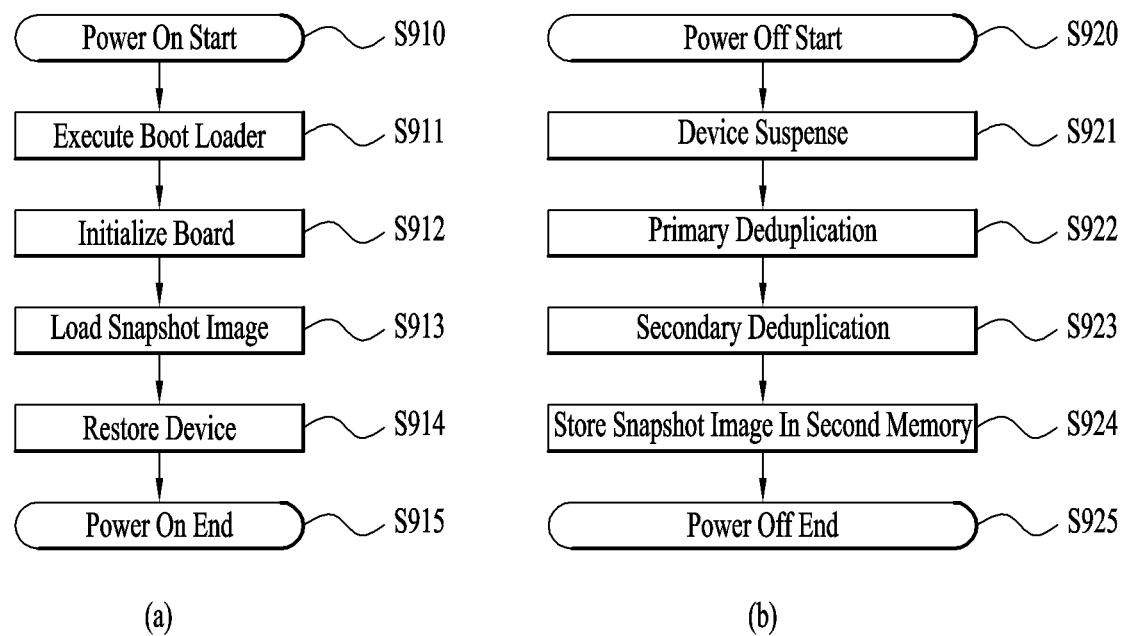
FIG. 9-(a) is a flowchart showing a sequence of booting according to a snapshot image of the present disclosure when system power is applied.

FIG. 9-(a) is a flowchart showing a sequence of booting according to a snapshot image of the present disclosure when system power is applied Referring to FIG. 9-(a), in the case of a digital device performing hibernation booting, when power is applied (S910), a boot loader is executed (S911), and a board initialization operation of initializing the hardware device is performed (S912). Then, the snapshot image stored in the second memory 120 is loaded into the first memory 110 (S913). Thereafter, the device is restored to the system state just before shutdown based on the page data information about the snapshot image (S914).

FIG. 9-(b) is a flowchart illustrating a procedure of generating a snapshot image according to the present disclosure when system power is turned off.

When a power-off command is delivered (S920), a power saving mode is set in which power is not supplied to the remaining hardware areas except for the first memory 110 (S921).

Power is supplied to the first memory 110 because, in general, a system memory such as RAM is a volatile memory, and when power is turned off, information stored in the memory is lost. Accordingly, power must be kept supplied while a snapshot image is being generated based on the page data in the first memory 110.

Thereafter, primary deduplication (S922) and secondary deduplication (S923) are performed on the page data stored in the first memory 110 depending on whether there are duplicate data. Then, a snapshot image is generated based on the remaining page data, and the generated snapshot image is stored in the second memory 120 (S924). Thereafter, the system is shut down (S925).

FIG. 10 shows data for explanation of a difference between the conventional technology and the present disclosure in volume of a snapshot image programmed or stored in the second memory 120 when the snapshot image is generated.

This data is a result obtained by performing a performance test on AVN (Audio Video Navigation), which is one of the electronic components of an automobile. In the AVN, the first memory is a RAM and the second memory is a flash memory.

As shown in FIG. 10, when a snapshot image is stored using conventional technology, about 300 MiB of data is additionally programmed into the flash memory.

However, in the present disclosure, when generating a snapshot image, the primary and secondary deduplication operations are performed, and therefore the newly programmed data is about 20 MiB, which is about one tenth of the data in the conventional technology.

As described above, for a flash memory, the number of times a program can be performed on each cell is limited. Thus, frequently storing a lot of data every time the power is turned off may deteriorate lifespan reliability. Therefore, the results shown in FIG. 10 may suggest that the technology of the present may improve the lifespan reliability by 10 times or more compared to the conventional technology.

Additionally, the effect of the secondary deduplication according to the present disclosure may be confirmed through comparison in terms of the loading speed of the snapshot image.

Typically, the purpose of performing hibernation booting is fast booting of a digital device, but multiple times of deduplication may accelerate data fragmentation, thereby making continuous data reading difficult and hindering fast booting.

However, through the second deduplication operation 103, deduplication is performed only when duplicate page data is located in the hot cluster, and in the other cases, a new cluster is allocated to continuously store the data. Accordingly, when data is loaded afterwards, continuous reading may be performed, and degradation in booting speed caused by data fragmentation may be prevented.

As can be seen from FIG. 10, the loading speed of the snapshot image is about 140 MiB/sec and is similar between the conventional technology and the present invention.

That is, when the snapshot image is loaded into the RAM, the size of data read from the flash memory is similar. Accordingly, it may be seen that data fragmentation is not a problem in the snapshot image according to the present disclosure.

A method for controlling a digital device disclosed in the present specification may be implemented as processor-readable codes on a processor-readable recording medium provided in the digital device. The processor-readable recording medium includes all types of recording devices in which data readable by the processor is stored. Examples of the processor-readable recording medium include a ROM, a RAM, a CD-ROM, a magnetic tape, a floppy disk, and an optical data storage device, and also include implementation in the form of a carrier-wave as in transmission over the Internet. In addition, the processor-readable recording medium may be distributed to computer systems connected over a network such that the processor-readable code may be stored and executed in a distributed fashion.

Although embodiments of the present disclosure have been described with reference to the accompanying drawings, they are merely examples and the present disclosure is not limited to a specific embodiment. Various modification that can be made by those of ordinary skill in the art to which the present disclosure belongs are also within the scope of the present disclosure as defined in the claims. Such modifications should not be individually understood from the spirit of the present disclosure.

The invention claimed is:

1. A method for controlling a digital device for performing a booting process, the digital device including a first memory and a second memory, the method comprising:
   removing, by a processor in the digital device, duplicate page data from among page data stored in the first memory by storing location information about the duplicate page data in a mapping table;
   comparing, by the processor, page data remaining after the removing with page data pre-stored in the second memory;
   selectively removing, by the processor, the duplicate page data from the page data pre-stored in the second memory depending on whether the duplicate page data is located in a hot cluster of the second memory as a result of the comparison
   generating, by the processor, a snapshot image based on page data remaining after the selective removing; and
   booting the digital device using the generated snapshot image in a subsequent powering on of the digital device,
   wherein the selectively removing the duplicate page data includes performing cluster management comprising:
       comparing the page data remaining after the primary deduplication in the first memory with page data included in blocks stored in the second memory;
       incrementing a use counter for the blocks by a predetermined value when duplicate page data is present in the blocks as a result of the comparing;
       designating a hot block and a hot cluster based on a value of the block use counter for a cluster including a predetermined number of the blocks located on the second memory; and
       storing the hot cluster in the second memory and updating a cluster table with designation information for the hot cluster, the hot cluster including at least some of the duplicate page data remaining after the primary deduplication.

2. The method of claim 1, wherein the first memory includes a random access memory (RAM), and
   wherein the second memory includes a flash memory.

3. The method of claim 1, wherein the removing of the duplicate page data from among the page data stored in the first memory comprises:
   calculating a hash value on a page-by-page basis for the page data stored in the first memory; and
   determining whether the calculated hash value is duplicate,
   wherein, for page data having a duplicate hash value, only the location information about the duplicate page data is stored in the mapping table.

4. The method of claim 3, wherein a mapping relationship between logical addresses of the page data stored in the first memory and physical addresses of page data stored in the second memory is set in the mapping table.

5. The method of claim 1, wherein the selectively removing of the duplicate page data comprises:
   determining whether the page data remaining after the primary deduplication and the page data pre-stored in the second memory overlap through a hash value calculated on a page-by-page basis,
   wherein, when page data having a duplicate hash value is located in the hot cluster of the second memory, only location information about the duplicate page data is stored in a mapping table.

6. The method of claim 1, further comprising:
   in response to a portion of the duplicate page data belonging to a cold cluster, allocating a new cluster and continuously storing the duplicate page data in the new cluster,
   wherein the cold cluster refers to a cluster having a certain number of cold blocks,
   wherein the cold blocks refer to blocks having a number of times of duplicate use less than or equal to a certain value.

7. The method of claim 1, further comprising:
   designating the hot block when the value of the block use counter is greater than a first threshold; and
   designating the hot cluster when the number of the hot blocks is greater than a second threshold and data fragmentation is greater than a third threshold.

8. The method of claim 1, wherein the generating of the snapshot image comprises:
   compressing page data remaining after selectively removing the duplicate page data; and
   allocating a cluster space for storing the compressed page data.

9. The method of claim 8, further comprising:
   storing the generated snapshot image in the second memory.

10. The method of claim 1, wherein the hot cluster includes a plurality of blocks,
    wherein each of the plurality of blocks includes a plurality of pages, and
    wherein each of the plurality of pages includes page data.

11. A digital device comprising:
    a first memory;
    a second memory configured to store a snapshot image generated based on page data stored in the first memory; and a processor configured to:
remove duplicate page data from among the page data stored in the first memory by storing location information about the duplicate page data in a mapping table;
compare page data remaining after removing the duplicate page data with page data pre-stored in the second memory;
selectively remove the duplicate page data from the page data pre-stored in the second memory depending on whether the duplicate page data is located in a hot cluster of the second memory as a result of the comparison;
generating a snapshot image based on page data remaining after the selective removing; and
booting the digital device using the generated snapshot image in a subsequent powering on of the digital device,
wherein the processor is further configured to:
compare the page data remaining after primary deduplication in the first memory with page data included in blocks stored in the second memory to generate a comparison result;
increment a use counter for the blocks by a predetermined value when duplicate page data is present in the blocks based on the comparison result;
designate a hot block and a hot cluster based on a value of the block use counter for a cluster including a predetermined number of the blocks located on the second memory; and
store the hot cluster in the second memory and update a cluster table with designation information for the hot cluster, the hot cluster including at least some of the duplicate page data remaining after the primary deduplication.

12. The digital device of claim 11, wherein the first memory includes a random access memory (RAM), and wherein the second memory includes a flash memory.

13. The digital device of claim 11, wherein the processor is further configured to:
designate the hot block when the value of the block use counter is greater than a first threshold; and
designate the hot cluster when the number of the hot blocks is greater than a second threshold and data fragmentation is less than a third threshold.

14. The digital device of claim 11, wherein the hot cluster includes a plurality of blocks,
wherein each of the plurality of blocks includes a plurality of pages, and
wherein each of the plurality of pages includes page data.

15. The digital device of claim 11, wherein the processor is further configured to allocate a new cluster and continuously store the data therein, in response to the duplicate page data belonging to a cold cluster,
wherein the cold cluster refers to a cluster having a certain number of cold blocks,
wherein the cold blocks refer to blocks having the number of times of duplicate use less than or equal to a certain value.

16. A method for controlling a digital device for performing a booting process, the digital device including a first memory and a second memory, the second memory including a hot cluster and a cold cluster, the method comprising:
removing, by a processor in the digital device, duplicate page data from among page data stored in the first memory by storing location information about the duplicate page data in a mapping table;
comparing, by the processor, page data remaining after the removing with page data pre-stored in the second memory;
selectively removing, by the processor, the duplicate page data from the page data pre-stored in the second memory depending on whether the duplicate page data is located in the hot cluster or the cold cluster of the second memory as a result of the comparison;
generating, by the processor, a snapshot image based on page data remaining after the selective removing;
in response to a portion of the duplicate page data belonging to the cold cluster, allocating a new cluster and continuously storing the duplicate page data in the new cluster; and
booting the digital device using the generated snapshot image in a subsequent powering on of the digital device,
wherein the cold cluster refers to a cluster having a certain number of cold blocks, and
wherein the cold blocks refer to blocks having a number of times of duplicate use less than or equal to a certain value.

* * * * *